US011285835B2

(12) United States Patent
Sun et al.

(10) Patent No.: US 11,285,835 B2
(45) Date of Patent: Mar. 29, 2022

(54) SYSTEM AND METHOD FOR RECHARGING DEPLETED HYBRID VEHICLE BATTERY

(71) Applicant: Ford Global Technologies, LLC, Dearborn, MI (US)

(72) Inventors: Xuemei Sun, Canton, MI (US); John Paul Gibeau, Canton, MI (US); William David Treharne, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 328 days.

(21) Appl. No.: 16/681,544

(22) Filed: Nov. 12, 2019

(65) Prior Publication Data
US 2021/0138922 A1 May 13, 2021

(51) Int. Cl.
*B60L 53/60* (2019.01)
*B60L 1/00* (2006.01)
*B60L 50/16* (2019.01)
*B60L 3/04* (2006.01)
*B60L 3/12* (2006.01)
*B60L 3/00* (2019.01)

(52) U.S. Cl.
CPC ............... *B60L 53/60* (2019.02); *B60L 1/003* (2013.01); *B60L 3/0069* (2013.01); *B60L 3/04* (2013.01); *B60L 3/12* (2013.01); *B60L 50/16* (2019.02)

(58) Field of Classification Search
CPC .......... B60L 53/60; B60L 50/16; B60L 1/003; B60L 3/0069; B60L 3/04; B60L 3/12
USPC .......................................................... 320/109
See application file for complete search history.

(56) References Cited

U.S. PATENT DOCUMENTS

| 7,253,584 | B2 | 8/2007 | Souther et al. |
| 8,466,586 | B2 | 6/2013 | Tarchinski et al. |
| 9,114,716 | B2 | 8/2015 | Loftus et al. |
| 2006/0158156 | A1* | 7/2006 | Gamboa ............... H02J 7/0031 320/141 |
| 2015/0151740 | A1* | 6/2015 | Hynes ..................... B60L 50/64 701/29.2 |
| 2019/0176803 | A1* | 6/2019 | Tabatowski-Bush ..... B60L 3/04 |

FOREIGN PATENT DOCUMENTS

| DE | 102020129801 | A1 * | 5/2021 | ............... B60L 3/12 |
| WO | WO-2020185877 | A1 * | 9/2020 | ............ H02J 50/005 |

* cited by examiner

*Primary Examiner* — Suresh Memula
(74) *Attorney, Agent, or Firm* — David B Kelley; Brooks Kushman P.C.

(57) ABSTRACT

A system and method are disclosed for charging a depleted battery within a first hybrid vehicle when connected to a second hybrid vehicle using a junction box. The system may include a wire harness having high voltage interlock connectors (HVIL) and high voltage (HV) connectors that connected to both the first vehicle and second vehicle. The system may also include one or more controllers that engage the charged battery to start a first engine within the first vehicle or, alternatively, a second engine within the second vehicle. After the first engine or second engine is started, the charged battery will be disconnected and the depleted battery may be connected using a set of HV contactors. The first engine or the second engine may then be operated to charge the depleted battery. Charging may stop when the depleted battery is charged within a specified SoC range.

20 Claims, 9 Drawing Sheets

SYSTEM AND METHOD FOR RECHARGING DEPLETED HYBRID VEHICLE BATTERY

TECHNICAL FIELD

This disclosure relates to a system and method of recharging a high-voltage battery within a hybrid vehicle.

BACKGROUND

Hybrid-electric vehicles include a high voltage (HV) battery (i.e., traction battery) that is generally used to supply energy to an electric machine for propelling the vehicle. The energy from the battery may also be used to power electronics within the vehicle. When the battery becomes deeply depleted, a controller within the hybrid vehicle may disconnect the battery. Once disconnected, the battery may either be replaced or recharged before it is reconnected.

SUMMARY

A system and method is disclosed for a junction box that may be used for charging a depleted battery within a first hybrid vehicle when connected to a second hybrid vehicle having a charged battery. The system may comprise a junction box having a wire harness that includes a high voltage interlock connector (HVIL) that connects to a first HVIL source within both the first and second hybrid vehicle. The junction box may also include high voltage (HV) connectors that connect to a first HV bus within the first vehicle, a second HV bus within the second vehicle, and a first inverter system (having insulated-gate, bi-polar or "IGBT" switching elements) within the first vehicle. The system may also include one or more controllers operable to receive from the first vehicle a first set of power operating parameters about the depleted battery and a second set of power operating parameters about a charged battery within the second vehicle. The one or more controllers may verify that the first set of power operating parameters and the second set of power operating parameters permit the second vehicle to charge the depleted battery.

If the second vehicle is compatible for charging the depleted battery, a first set of high-voltage (HV) contactors (e.g., single-pole, single-throw switches) will be disengaged within the first vehicle to disconnect the depleted battery, and a second set of high voltage contactors within the second vehicle will be engaged to connect the charged battery to the first vehicle. The charged battery will then be used to start the first engine. Once started, the first engine may be operated within a secondary idle condition while the charged battery is disconnected (using the second set of HV contactors) and the depleted battery may be connected (using the first set of HV contactors). A charging service routine may then be started where the first engine is operated in a primary idle condition to charge the depleted battery. When the depleted battery is charged (e.g., the depleted battery is determined to be within a first set of power operating parameters, like a specified SoC range) the charging service routine will be determined to be complete and charging will stop.

Alternatively, if the second vehicle is compatible for charging the depleted battery, a first set of high-voltage (HV) contactors (e.g., single-pole, single-throw switches) will be disengaged within the first vehicle to disconnect the depleted battery, and a second set of high voltage contactors within the second vehicle will be engaged to connect the charged battery to the second vehicle. The charged battery will then be used to start the second engine. Once started, the second engine may be operated within a secondary idle condition while the charged battery is disconnected (using the second set of HV contactors) and the depleted battery may be connected (using the first set of HV contactors). A charging service routine may then be started where the second engine is operated in a primary idle condition to charge the depleted battery. When the depleted battery is charged (e.g., the depleted battery is determined to be within a first set of power operating parameters, like a specified SoC range) the charging service routine will be determined to be complete and charging will stop.

During battery charging, the one or more controllers may also monitor and disengage the charging service if one or more fault codes exist. For instance, the one or more controllers may monitor and ensure that the second set of HV contactors are not engaged while the depleted battery is being charged. The one or more controllers may also be operable to monitor if the second set of HV contactors are generating an in-rush current that exceeds a predefined threshold; there exists a contactor welding fault; or there exists a high voltage leakage fault. The one or more controllers may also be operable to monitor the wire harness to determine proper connection and that no HVIL fault code (e.g., open circuit). If a fault code is detected, the HV connectors may be disconnected to stop the charging of the depleted battery.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
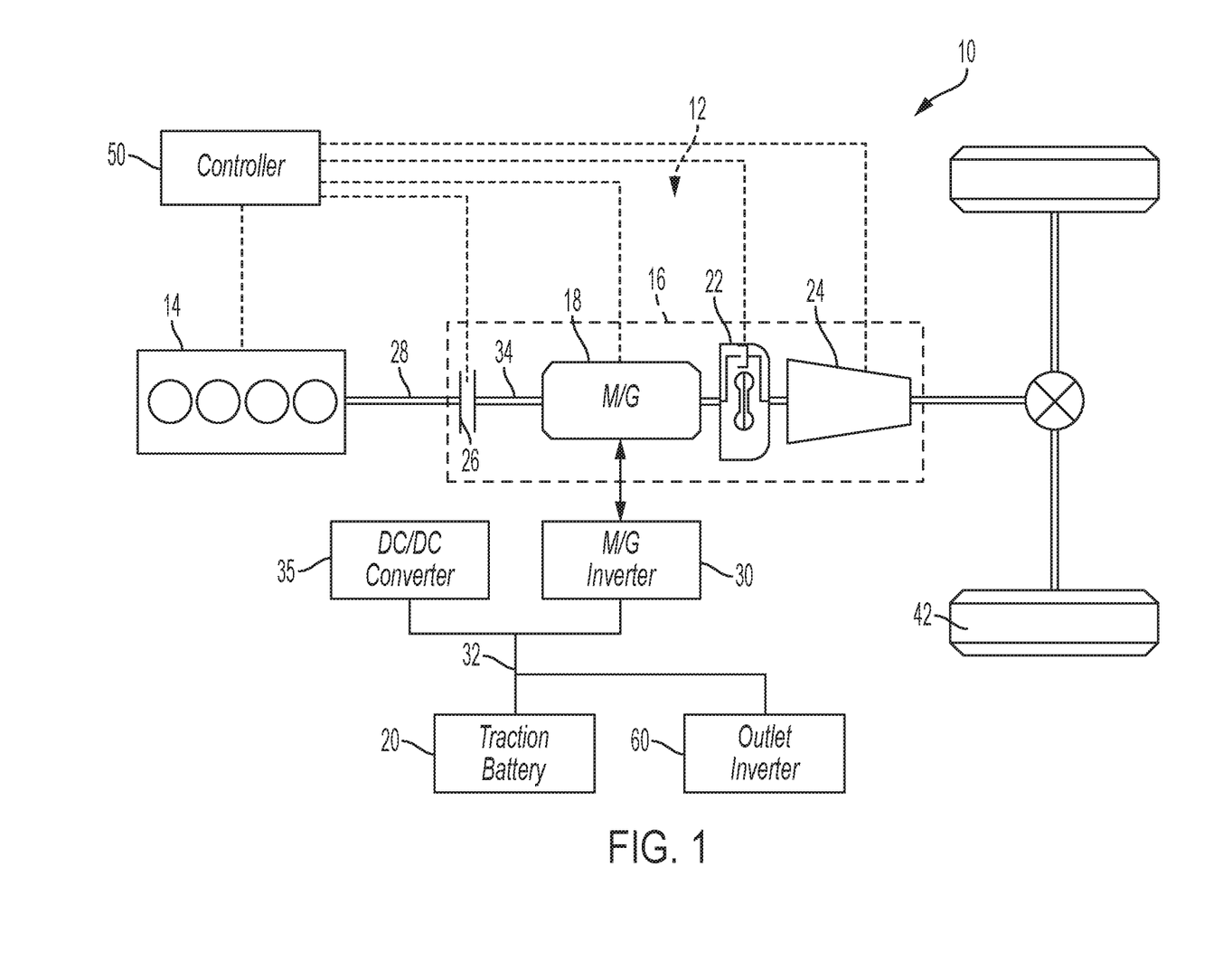
FIG. 1 illustrates an exemplary topology of a first hybrid electric vehicle.

Referring to FIG. 1, a schematic diagram of a hybrid-electric vehicle 10 is illustrated according to an embodiment of the present disclosure. The vehicle 10 includes an auxiliary power system that allows the vehicle 10 to be used as a mobile generator or inverter. FIG. 1 illustrates representative relationships among the components. Physical placement and orientation of the components within the vehicle may vary. The vehicle 10 includes a powertrain 12. The powertrain 12 may include an engine 14 that drives a transmission 16, which may be referred to as a modular hybrid transmission (MHT). As will be described in further detail below, the transmission 16 may include an electric machine such as an electric motor/generator (M/G) 18, an associated traction battery 20, a torque converter 22, and a multiple step-ratio automatic transmission or gearbox 24. For simplicity, the M/G 18 may be referred to as a motor. The engine 14, M/G 18, torque converter 22, and the gear box 24 may be connected sequentially in series, as illustrated in FIG. 1.

The engine 14 and the M/G 18 are both drive sources for the vehicle 10 and may be referred to as actuators. The engine 14 generally represents a power source that may include an internal-combustion engine such as a gasoline, diesel, or natural gas engine. The engine 14 generates engine power and corresponding engine torque that is supplied to the M/G 18 when a clutch 26 (i.e., disconnect clutch) between the engine 14 and the M/G 18 is at least partially engaged. The M/G 18 may be implemented by any one of a plurality of types of electric machines. For example, M/G 18 may be a permanent magnet synchronous motor.

The M/G 18 is powered by a traction battery 20 (i.e., high voltage battery). The traction battery 20 stores energy in a plurality of individual battery cells connected together to provide a desired voltage and charge capacity. In one embodiment, traction battery 20 includes an array of lithium-ion battery cells. The traction battery 20 typically provides a high-voltage direct current (DC) output to a high-voltage bus 32, although the voltage and current may vary depending on particular operating conditions and loads. The traction battery 20 is electrically connected to an M/G power inverter 30, and a DC/DC converter 35, for example. The power inverter 30 converts DC power from the battery to AC power for use with the electric machines. For example, power electronics may provide three-phase alternating current (AC) to the M/G 18. The power inverter 30 is also capable of acting as a rectifier. The DC/DC converter 35 is configured to convert the high-voltage DC output of the traction battery 20 to a low-voltage DC supply that is compatible with other vehicle loads that may be directly connected thereto. The inverter 30 may include an inductor configured to step-up or step down current and voltage.

One or more contactors may isolate the traction battery 20 from other components when open and connect the traction battery 20 to the other components when closed. The traction battery 20 may include various internal circuits for measuring and monitoring various operating parameters including cell current and individual cell voltage. Parameters such as voltage, current and resistance for a battery cell or a group of battery cells (sometimes referred to an array) may be monitored and/or controlled by a vehicle controller 50.

Vehicle 10 may also include an auxiliary battery having a relatively lower nominal voltage (such as 24V or 48V, for example) and may be implemented using different battery chemistries than the traction battery 20. The auxiliary battery may also be referred to as a low-voltage battery, starter battery or simply the vehicle battery for various applications. The auxiliary battery may be used to power various low-voltage components, controllers, modules, motors, actuators, sensors, etc.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 34 into electrical energy to be stored in the battery 20 or used by vehicle systems such as an auxiliary electrical system. The disconnect clutch 26 can also be disengaged to isolate the engine 14 from the remainder of the powertrain 12 such that the M/G 18 can act as the sole drive source for the vehicle 10. The M/G 18 is continuously, drivably connected to the shaft 34, whereas the engine 14 is drivably connected to the shaft 34 only when the disconnect clutch 26 is at least partially engaged. When the disconnect clutch 26 is locked (fully engaged), the crankshaft 28 is fixed to the shaft 34.

The vehicle 10 includes an outlet power generator-inverter 60 connected to the high-voltage bus 32. The generator-inverter 60 is configured to convert the DC power of the bus 32 to AC power that is compatible with the auxiliary power system. The generator-inverter 60 may also be configured to stepdown the voltage of the bus 32 to voltages compatible with the auxiliary power system such as common wall voltages of 120-Volts AC and/or 240-Volts AC.

It should be understood that the schematic illustrated in FIG. 1 is merely exemplary and is not intended to be limiting. Other series-hybrid configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Further, the vehicle 10, in other embodiments, may include a parallel-hybrid configured (also known as a split hybrid).

The vehicle 10 may also include a controller 50 such as a powertrain control unit (PCU), an engine control module (ECM), a motor control unit (MCU), and a DC/AC inverter controller (DCACA). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller 50 within each of the subsystems identified above.

Figure 2A:
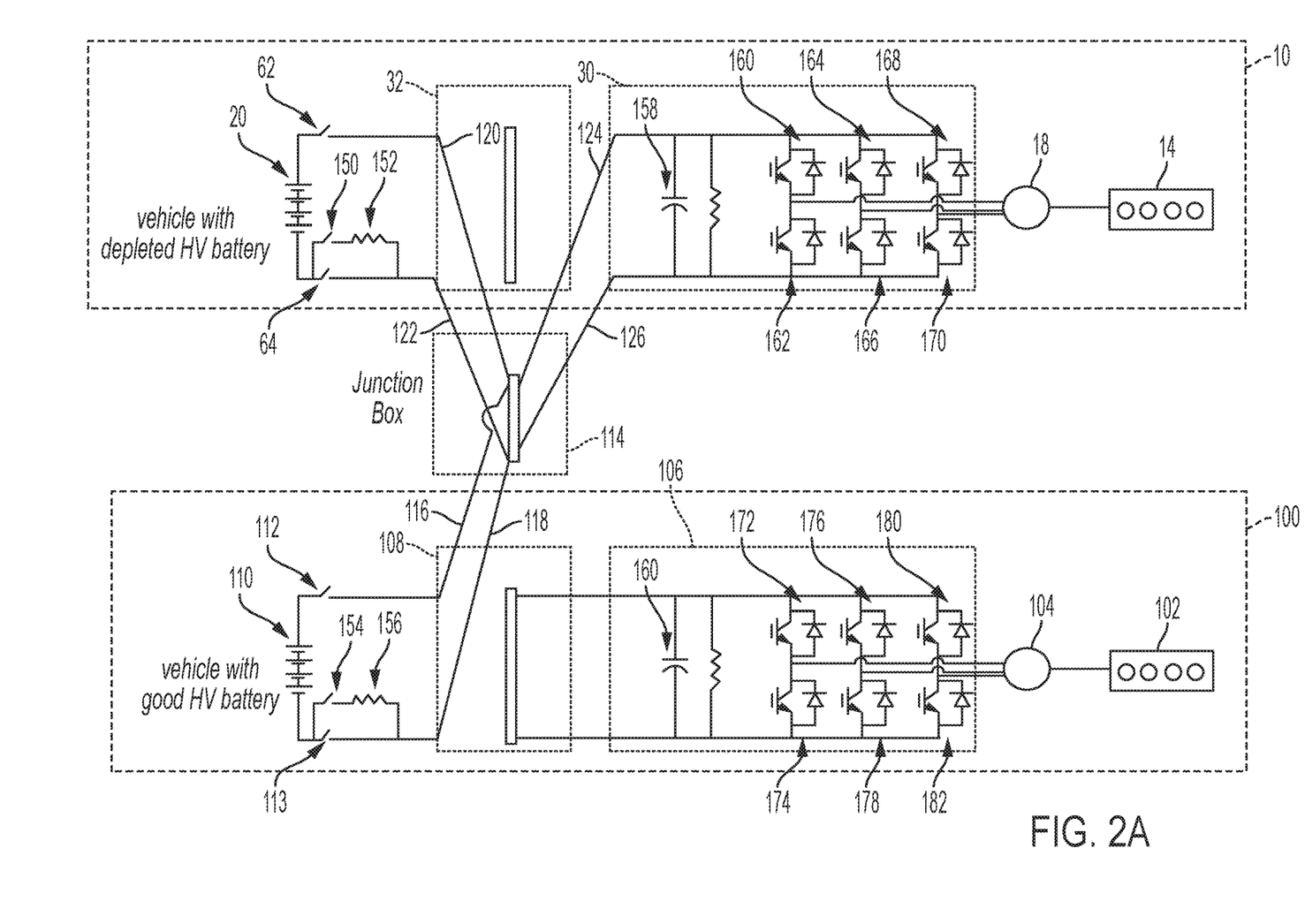
FIG. 2A illustrates an exemplary topology for a first embodiment of a junction box used to connect the hybrid electric vehicle to a second hybrid electric vehicle used for regenerative charging.

FIG. 2A illustrates an electrical topology for the vehicle 10. Generally, and as described above, the engine 14 may be connected M/G 18 when clutch 26 is engaged. Engine 14 may operate M/G 18 as a generator and inverter 30 may convert mechanical energy to electrical energy that can be used to recharge battery 20 through high-voltage bus 32. FIG. 2 further illustrates a positive contactor 62 and negative contactor 64 that may be electronically actuated by controller 50 to isolate the battery 20 from other components when actuated in an open position and to connect the battery 20 when actuated in a closed position. The battery 20, positive contactor 62, and negative contactor 64 may alternatively be packaged as part of a larger battery electronic control module (BECM) that includes and are controlled by controllers separate than controller 50.

It is contemplated that when the battery 20 exceeds a lower threshold (e.g., SOC<10%), the controller 50 may disconnect the battery 20 from the DC bus in order to avoid battery from becoming depleted to an unacceptable level that may damage the battery 20. It is also contemplated that battery 20 from bus 32 may also result in the vehicle 10 not operating as intended. When the battery 20 becomes depleted to undesirable levels, a field technician may be required to provide service that includes replacing the battery 20. However, replacing the battery 20 may be a costly service requirement. Alternatively, servicing the battery 20 may include use of an off-board charger that is used to recharge the battery 20 back to a desirable operating range (e.g., 30%<SOC<90%).

It is understood that off-board chargers not purchased directly from an automotive manufacturer may lack features like a high voltage interlock (HVIL) or battery fault monitoring. Purchasing a vehicle specific off-board charger directly from an automotive manufacturer may provide such features, but the cost and maintenance of vehicle specific off-board chargers may exceed what typical users can afford. Also, recharging the battery 20 using off-board chargers is generally performed by authorized dealership service technicians requiring additional cost to the user. It is therefore desirable to have recharging method that may reduce the cost of the off-board charger, the cost of the shipping and maintain, and the cost for any road-side service performed by an authorized technician.

With reference again to FIG. 2A, one embodiment of the present invention includes a recharging system where a second vehicle 100 may be used to provide regenerative charging for battery 20. It is contemplated that the second vehicle 100 may be substantially comparable to the vehicle 10 described above. The second vehicle 100 may also include an engine 102, a motor/generator (M/G) 104, an inverter 106, a high voltage bus 108, a second battery 110, a positive contactor 112, a negative contactor 113, and a pre-charge contactor. It is also contemplated that the second battery 110 may be compatible with the battery 20. It is also contemplated that a junction box 114 may include a dual vehicle harness, a Service Tool 200 (not shown), and software necessary to service the battery 20.

As illustrated, wires 116, 118 may be connected from bus 108 of vehicle 100 to the junction box 114. Wires 120, 122 are then connected from the junction box 114 to the bus 32 of vehicle 10. This allows wires 120, 122 to be connected from the bus 32 to the battery 20. Also, wires 124, 126 are connected from the junction box 114 to the inverter 30 of vehicle 10. These connections allow the second battery 110 of vehicle 100 to be connected to the bus 32 of vehicle 10 to start the engine 14, engage/disengage clutch 26, and to control the temperature (i.e., warm or cool) battery 20. It is contemplated that wires 116-126 may be a high-voltage harness operable to handle high power loads transferred between vehicle 100 and vehicle 10. It is also contemplated that connection of wires 116-126 via junction box 114 may allow second battery 110 or battery 20 to be connected to bus 32 upon engagement of contactors 62, 64 or contactors 112, 113.

Figure 2B:
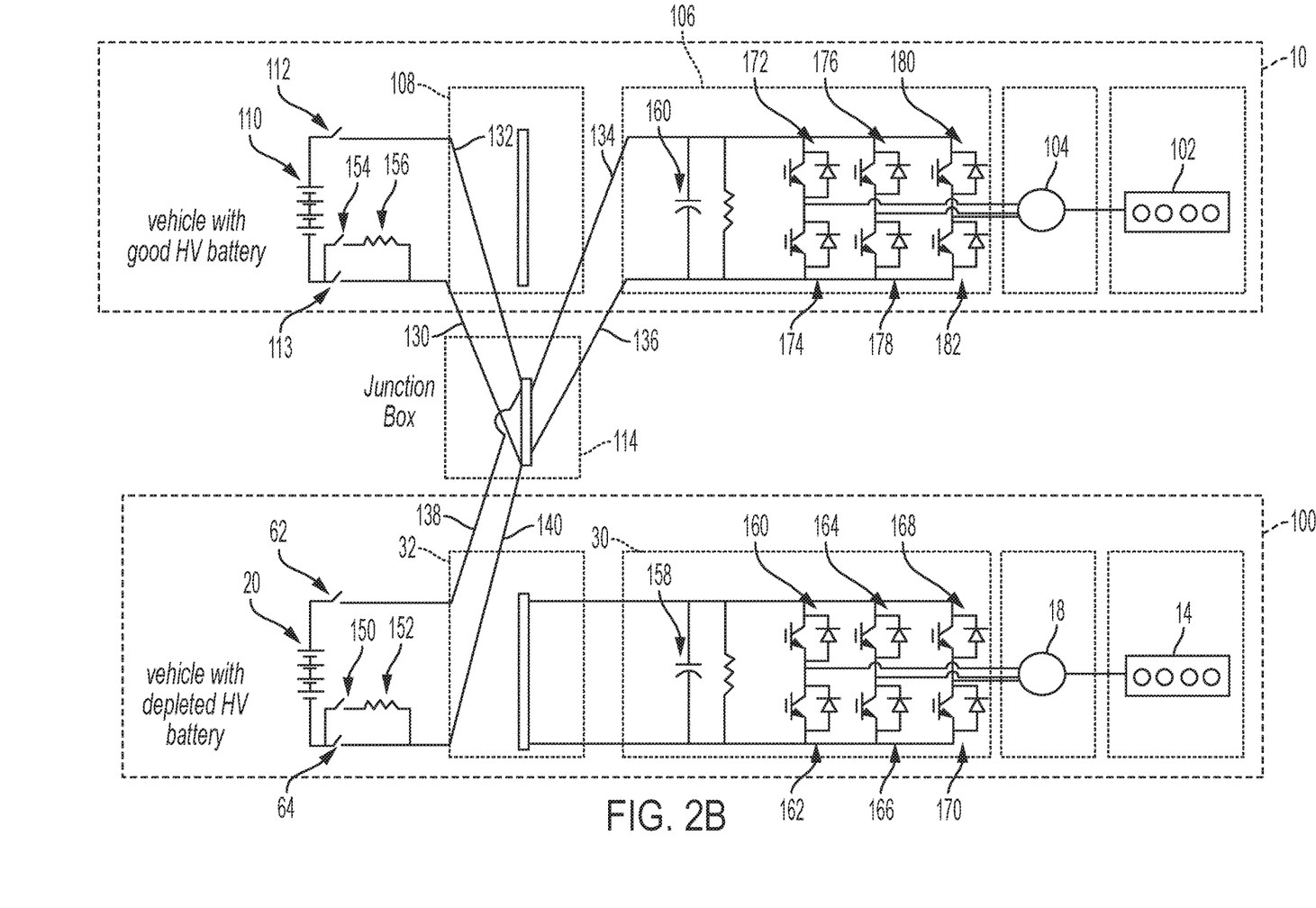
FIG. 2B illustrates an exemplary topology for a second embodiment of a junction box used to connect the hybrid electric vehicle to a second hybrid electric vehicle used for regenerative charging.

FIG. 2B illustrates an alternative embodiment for the connection between vehicle 10 and vehicle 100 that is operable to provide regenerative charging for battery 20. As shown, junction box 114 may again include a dual vehicle harness that includes wires 130-140. Wires 130, 132 may be connected to bus 108. Wires 134, 136 may be connected to inverter 106 of the vehicle 10. And, wires 138, 140 may be connected to the bus 32.

The topologies shown in FIGS. 2A and 2B may both be used to provide regenerative charging of the battery 20 when it is substantially depleted. For the connections shown by FIG. 2A, it is contemplated that regenerative charging of the battery 20 may begin by first closing contactors 112, 113 of second battery 110 to bus 32. Vehicle 10 may then be started (i.e., start the engine 14 and close any clutch of vehicle 10 that may exist between the motor 18 and engine 14). The second battery 110 may then be disconnected (e.g., by disengaging contactors 112, 113) and connect battery 20 (e.g., by engaging contactors 62, 64). Vehicle 10 may then be operable to provide regenerative charging to battery 20. It is contemplated that the topology illustrated by FIG. 2A, may be operable to control the temperature (i.e., warm or cool) of battery 20 using a temperature conditioning device (not illustrated) located within vehicle 10.

Figure 3:
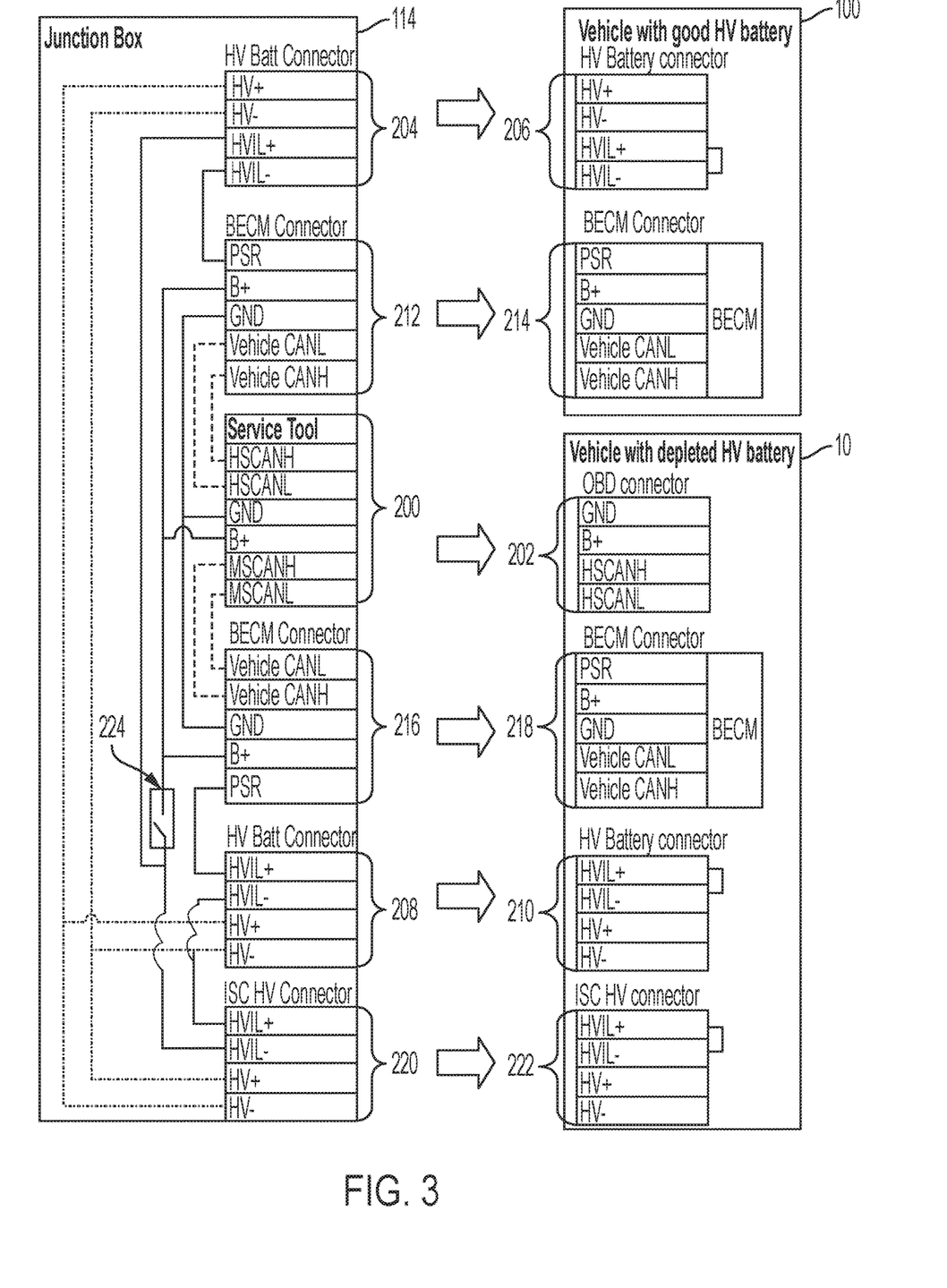
FIG. 3 illustrates connection of the first hybrid electric vehicle and the second electric hybrid electric vehicle using the junction box.

FIG. 3 illustrates one embodiment for the electrical connection between vehicle 100, vehicle 10, and junction box 114. FIG. 3 illustrates for connecting junction box 114 to vehicle 10 and vehicle 100 according to the embodiment illustrated by FIG. 2A. It is contemplated that junction box 114 may provide the wiring connection for the alternative embodiment of FIG. 2B by switching the connection for vehicle 10 and vehicle 100 shown in FIG. 3. It is further contemplated that junction box 114 may be operable to provide high voltage signals (i.e., connections between HV+ and HV−), low voltage signals (i.e., connections between the high voltage interlocks (HVIL+, HVIL−), power switched relay (PSR), 12 Volt DC Power (B+), and ground (GND), and shielded twisted-pair cables for CAN communications (i.e., dotted lines between Vehicle CANL, Vehicle CANH).

With reference to FIG. 3, junction box 114 may include the service tool 200 that connects to an on-board diagnostic port 202 (OBD) of vehicle 10. Junction box 114 may also include a dual vehicle harness that allows connection between inverter 30 and either battery 20 or second battery 110. The dual vehicle harness may connect second battery 110 to the junction box 114 using connector 204 and connector 206. The dual vehicle harness may also connect battery 20 to the junction box 114 using connector 208 and connector 210.

It is contemplated that vehicle 100 and vehicle 10 may both include a battery energy control module (BECM) that assists in the control and operation of battery 20 and the second battery 110. Each BECM may include a controller (e.g., controller 50) that may be operable to provide information related to the battery 20 and the second battery 110. For instance, the BECM may provide information relating to the state of charge (SOC), battery voltage, battery temperature, or whether contactors 62, 64, 112, 113 are engaged/disengaged. Junction box 114 may further include a dual vehicle low voltage harness that connects the BECM for vehicle 10 and the BECM for vehicle 100. The dual vehicle harness connects the BECM for vehicle 100 to the junction box 114 using connector 212 and connector 214. The dual vehicle harness may connect the BECM for vehicle 10 to the junction box 114 using connector 216 and connector 218.

FIG. 3 further illustrates that inverter 30 of vehicle 10 may be connected to junction box 114 using connector 220 and 222. Again, it is contemplated that connecting inverter 30 to junction box 114 is the embodiment illustrated by FIG. 2A. To accomplish the alternative embodiment illustrated by FIG. 2B, the connections for vehicle 10 and vehicle 100 would be switched. Once switched, inverter 106 would be connected to junction box 114 using connector 220.

Junction box 114 may be provided 12-Volts DC power (labeled B+) from the OBD connector 202 from vehicle 10. Junction box 114 may also provide a common ground between vehicle 10 and vehicle 100 by connecting the "GND" signal shown in connectors 212, 200, and 216. It is also contemplated that the high voltage interlock signals (HVIL+, HVIL−) may be provided to vehicle 10 and vehicle 100 where a controller (e.g., controller 50 or controllers within BECM module) may monitor the integrity of the high-voltage cable (HV+, HV−). If the controller determines that the high voltage connectors are properly connected, the signals HVIL+ and HVIL− may be outputting a 12 Volts DC signal. If the controller determines that the high voltage connectors are not properly connected, one or both of the signals HVIL+ and HVIL− may be outputting a 0 Volt signal. Also, the controller may detect a high voltage cable "open" fault and disconnect battery 20 and second battery 110 from bus 32. It is also contemplated that PSR is connected to a 12-Volt DC power when HVIL outputs a 12-Volt signal (i.e., ensuring contactors are disengaged or "open" when HVIL is open). Junction box 114 may further include a switch 224 that may be manually or programmatically controlled to disconnect the high voltage signal from the bus 32.

It is contemplated that the low voltage harness of connector 216 may be connected to vehicle 10 through connector 218, and the low voltage harness of connector 212 may be connected to vehicle 100 through connector 214. Service tool 200 is then operable to select either battery 20 or second battery 110 by closing contactors 62, 64, 112, 113.

It is contemplated that service tool 200 may include two or more CAN channels (e.g. high speed CAN and low speed CAN) and may receive one or more controller area network (CAN) messages. Based on the messages received, the service tool 200 may periodically transmits information that includes: data regarding battery 20 and second battery 110; data regarding the status of the high voltage interlock (HVIL); data regarding the status of contactors 62, 64, 112, 113; data regarding the power limit of battery 20 and second battery 110; data regarding the SOC, voltage, current and temperature of battery 20 and/or second battery 110. Service tool 200 may also receive messages from vehicle 10 and transmit those messages to vehicle 100, or vice versa.

Figure 4:
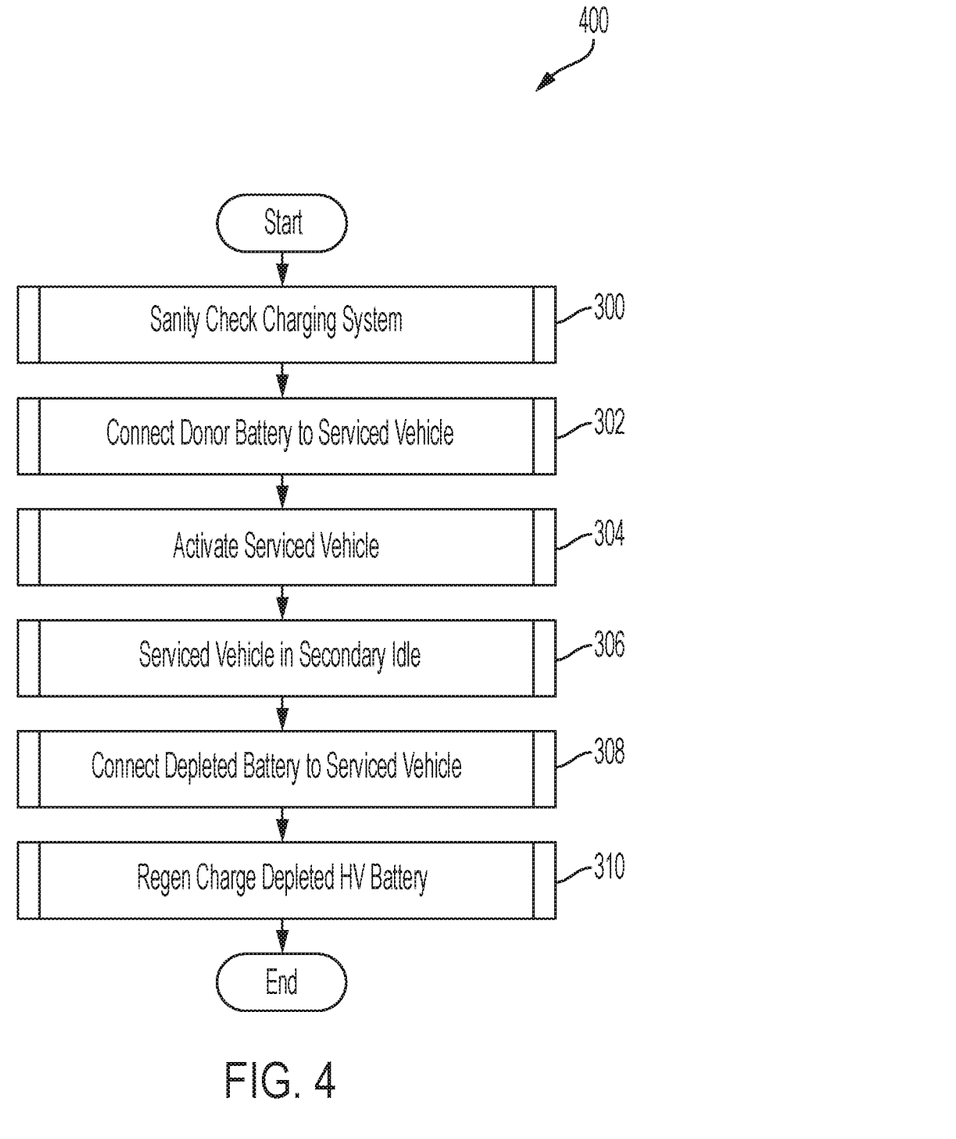
FIG. 4 illustrates a flow diagram for performing a regenerative charging sequence.

FIG. 4 illustrates a flow diagram 400 according to one embodiment of the present invention. Flow diagram 400 may begin at step 300 where a sanity check of the charging system may be performed. At step 300, service tool 200 may be used to verify the high voltage cable connection, compatibility between the battery 20 and the second battery 110, system faults (e.g., high voltage leakage or welding of contactors 62, 64, 112, 113). It is contemplated that service tool 200 may provide an error message on a display alerting that one or more sanity checks is not successful. Service tool 200 may also terminate charging between battery 20 and vehicle 10 if one or more sanity checks is not successful.

Figure 5:
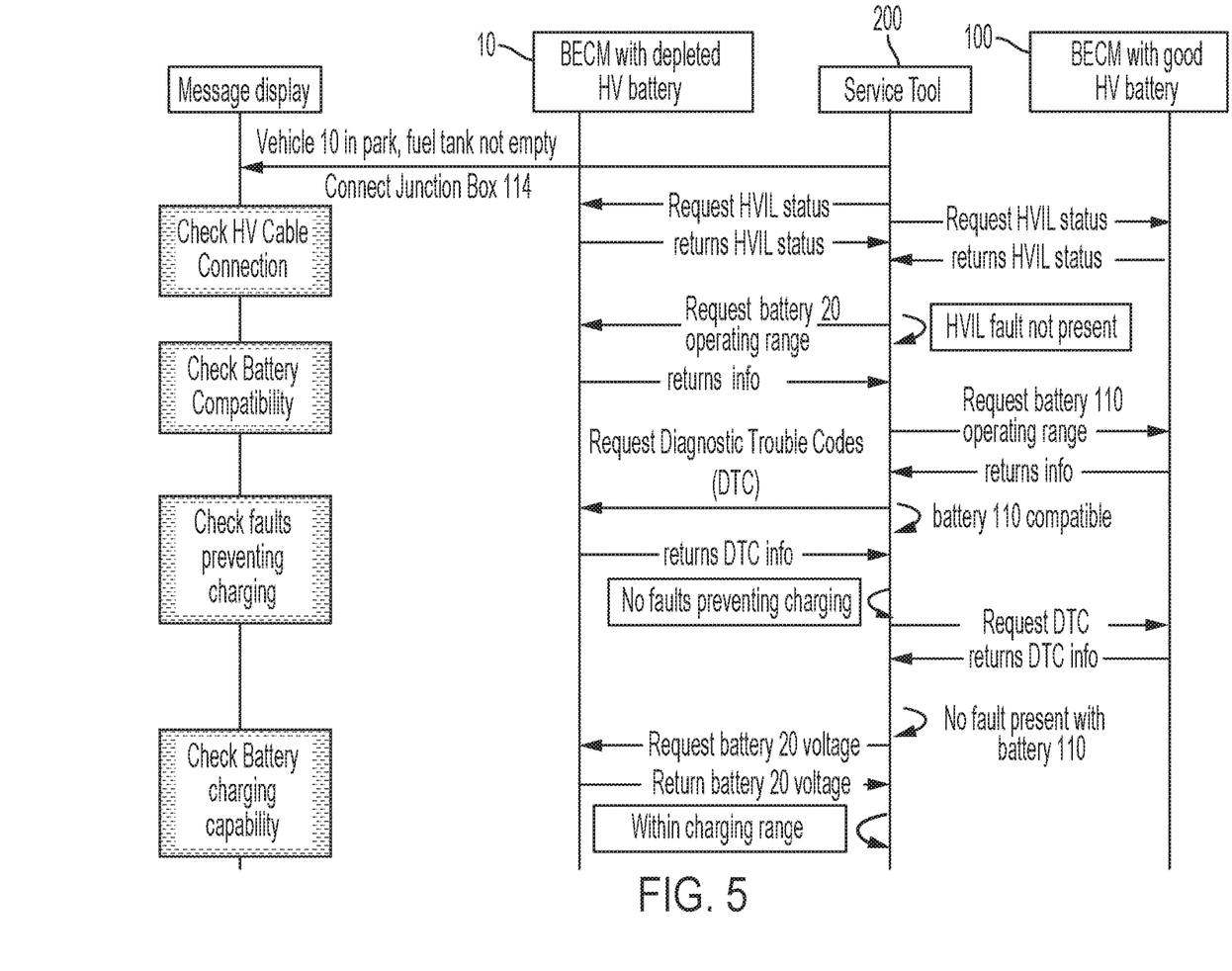
FIG. 5 illustrates a charging system sanity check sequence.

FIG. 5 illustrates an exemplary embodiment for how service tool 200 may perform the sanity checks of step 300. As illustrated, service tool 200 operates as an interface between signals and communications between vehicle 10 (having a battery 20 that is depleted) and the second vehicle 100 (having a second battery 110 that is not depleted). Prior to performing the sanity checks a technician may be required to verify that the transmission 24 of vehicle 10 is placed in a "park" position and that vehicle 10 has a verified level of gasoline. Technician would then connect junction box 114 to vehicle 10 and vehicle 100. However, it is contemplated that service tool 200 may also be operable to perform the sanity check procedure after connection of the junction box 114.

The service tool 200 may check the high voltage cable connection by requesting a high voltage interlock (HVIL) status of vehicle 10 and 100 to ensure that no HVIL fault is present. If no fault exists, the service tool 200 may check the compatibility of battery 20 and the second battery 110. Service tool 200 may check compatibility by requesting the operating range of battery 20 and the second battery 110. If battery 20 and the second battery 110 are compatible, the service tool 200 may perform one or more checks that would prevent charging of battery 20. For instance, service tool 200 may check the diagnostic trouble codes (DTC) provided by vehicle 10 and vehicle 100. If there are no diagnostic trouble codes indicate charging should not occur, the service tool 200 may check the charging capability of battery 20. For instance, service tool 200 may request and receive the voltage of battery 20. If battery 20 is within a predetermined charging range, service tool 200 would indicate that sanity checks are complete, and no errors exist.

At step 302, the second battery 110 (i.e., "donor battery") may be connected to vehicle 10 (i.e., "serviced vehicle") as illustrated by FIGS. 2A and 2B. It is contemplated that vehicle 10 may include a pre-charge contactor 150 that is connected in series with a pre-charge resistor 152. Pre-charge contactor 150 and pre-charge resistor 152 may be connected in parallel with contactor 64. However, it is contemplated that pre-charge contactor 150 and pre-charge resistor 152 may alternatively be connected in parallel with contactor 62. Vehicle 100 may also include a pre-charge contactor 154 that is connected in series with a pre-charge resistor 156. Pre-charge contactor 154 and pre-charge resistor 156 may be connected in parallel with contactor 113. However, it is contemplated pre-charge contactor 154 and pre-charge resistor 156 may be connected in parallel with contactor 112.

Figure 6:
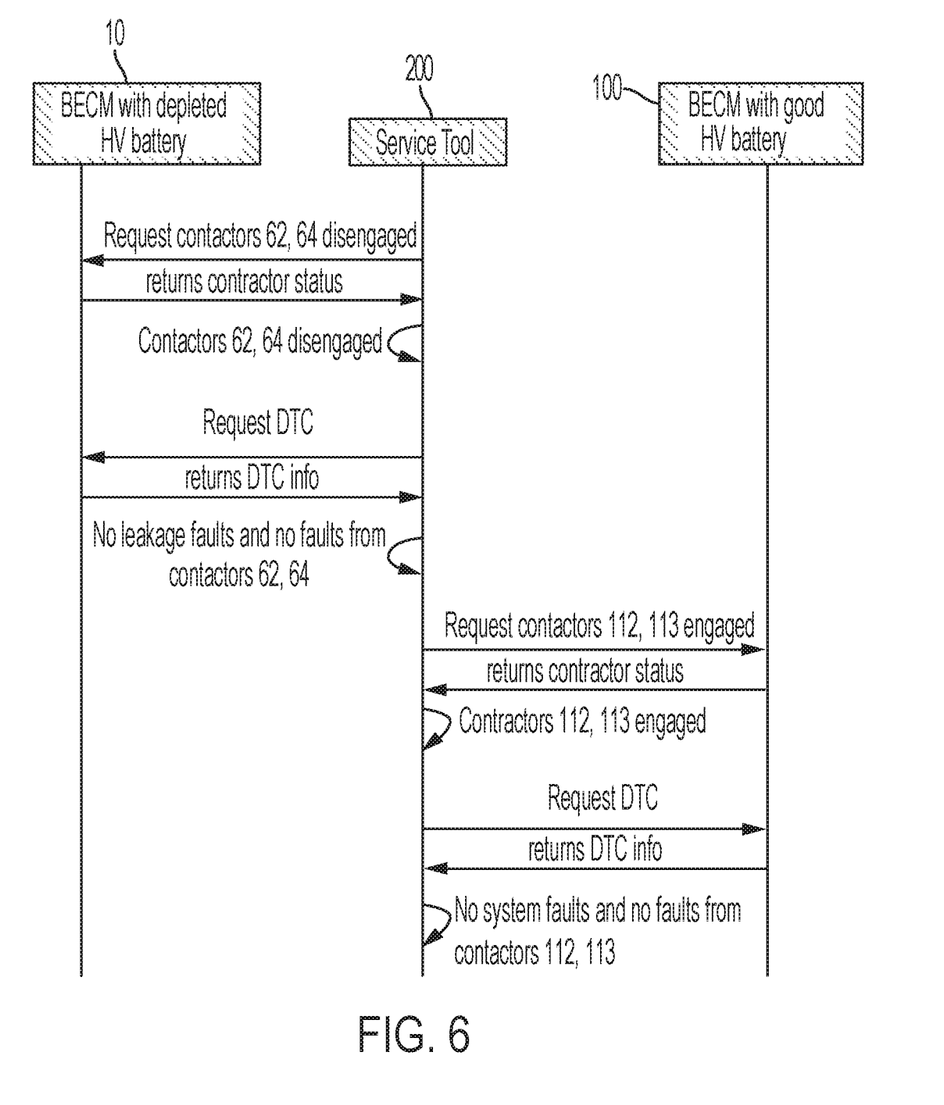
FIG. 6 illustrates a sequence to close battery contactors within the first hybrid electric vehicle and battery contactors within the second hybrid electric vehicle.

FIG. 6 illustrates a control sequence for service tool 200 to connect second battery 110 of vehicle 100 to bus 32 of vehicle 10. The service tool 200 may first request vehicle 10 to disengage contactor 62 and contactor 64. If contactors 62, 64 are disengaged (i.e., open), the service tool 200 may request additional diagnostic trouble codes (DTC) from vehicle 10. If vehicle 10 indicates that there does not exist a contactor or leakage fault, service tool 200 may request vehicle 100 to begin the engagement process for contactor 112, 154, and contactor 113. It is contemplated that the battery 20 from vehicle 10 and the battery 110 from vehicle 100 should not be connected on the DC bus 32 at the same time. The service tool 200 is operable to prevent battery 20 and battery 110 from being simultaneously connected by operating contactor close requests to the proper vehicle controller (i.e., BECM module) and by using pre-charge contactor for over-current protection and reaction.

Vehicle 100 would first engage (i.e., close) contactor 112. Vehicle 100 would then engage pre-charge contactor 154 until the DC-voltage across capacitor 158 reaches a DC-voltage level substantially equal to second battery 110. Once capacitor 158 is sufficiently charged, contactor 113 would be engaged and pre-charge contactor 154 would be disengaged. Once contactors 112, 113 are closed, service tool 200 would request additional diagnostic trouble codes (DTC) from vehicle 100. If vehicle 100 indicates that no battery system faults exist, service tool 200 would provide an indication that contactors 112, 113 are engaged.

Flow diagram 400 would then proceed to step 304 where vehicle 10 (i.e., service vehicle) is activated once the second battery 110 has been successfully connected to bus 32 of vehicle 10. At step 304, the engine 14 of vehicle 10 is engaged (i.e., started) and clutch 26 is engaged. Controller 50 may then operate to control the temperature of battery 20. For instance, controller 50 may engage the heater system to heat battery 20 or air-conditioner system to cool the battery 20. Controller 50 may then engage the DC/DC converter 35 to charge a 12-Volt battery located within vehicle 10. If vehicle 10 is not successfully activated, service tool 200 will output an error warning and will terminate the charging sequence of flow diagram 400.

Figure 7:
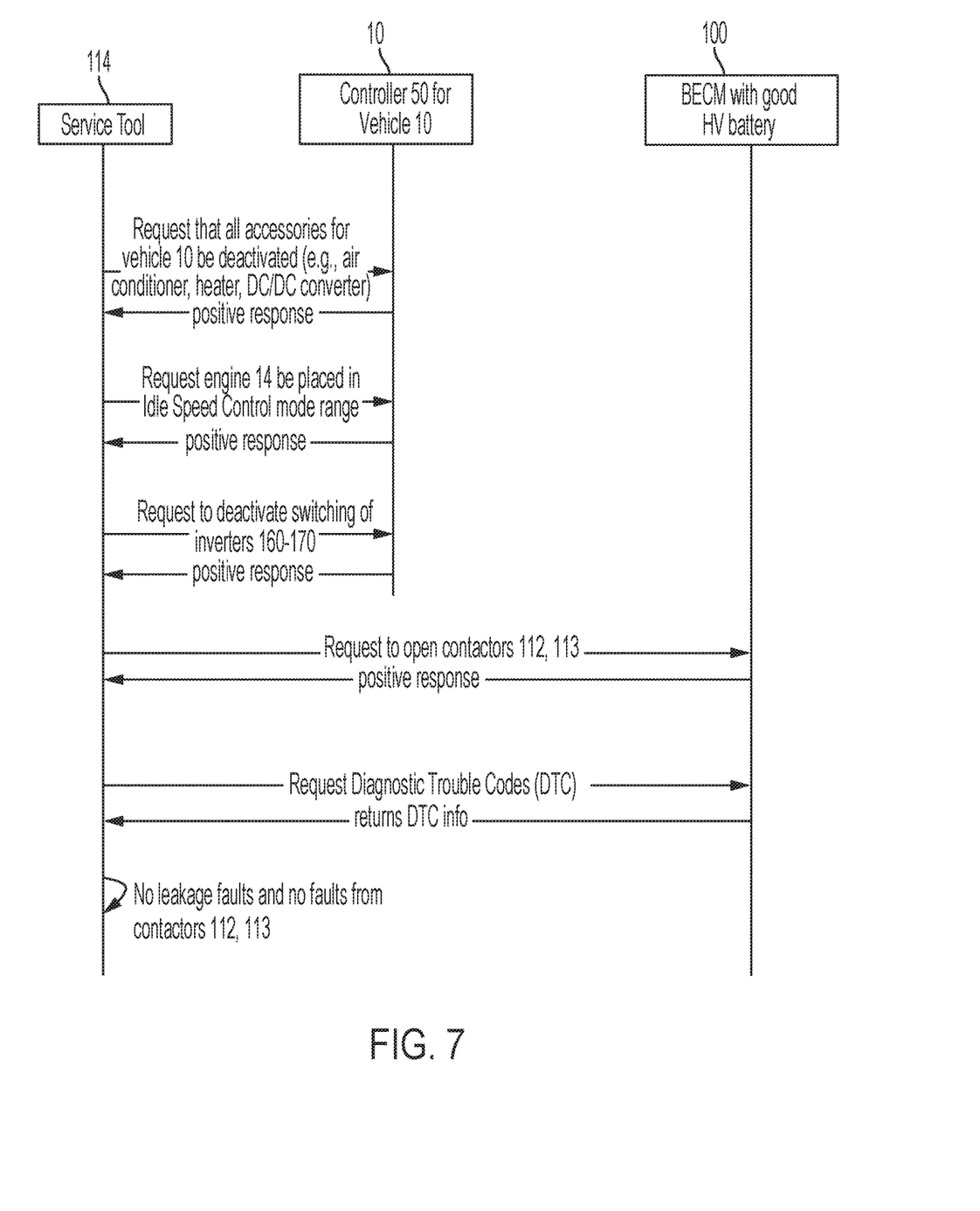
FIG. 7 illustrates a sequence to set the first hybrid vehicle to a secondary idle mode.

If successful, flow diagram 400 will proceed to step 306 where the engine 14 of vehicle 10 is placed within a secondary idle condition. The procedure for completing step 306 may be performed by the control sequence illustrated by FIG. 7. First, a technician or the service tool 200 may verify that the transmission 24 of vehicle 10 is placed within a park condition, the engine 14 is operating (i.e., running), clutch 26 is engaged, and that battery 20 is within a predefined temperature range. Upon a positive response, the service tool 200 may request that the DC/DC converter, air conditioner and/or heater be deactivated. Upon a positive response, engine 14 may be placed into an idle speed control mode so that the speed is high enough to keep the engine 14 operating with the clutch 26 closed. Upon a positive response, service tool 200 may request that, switching elements 160-170 of inverter 30 be disabled to prevent switching. Upon a positive response, service tool 200 may request that contactors 112, 113 be disengaged (i.e., opened) to disconnect second battery 110 from bus 32. Once contactors 112, 113 are disengaged, service tool 200 may request diagnostic codes from vehicle 100. Service tool 200 will verify that no battery system faults exist and that contactors 112, 113 are not generating a fault condition. Vehicle service tool 200 may output a fault message if step 306 is not completed. Otherwise, flow diagram 400 proceeds to step 308.

Figure 8:
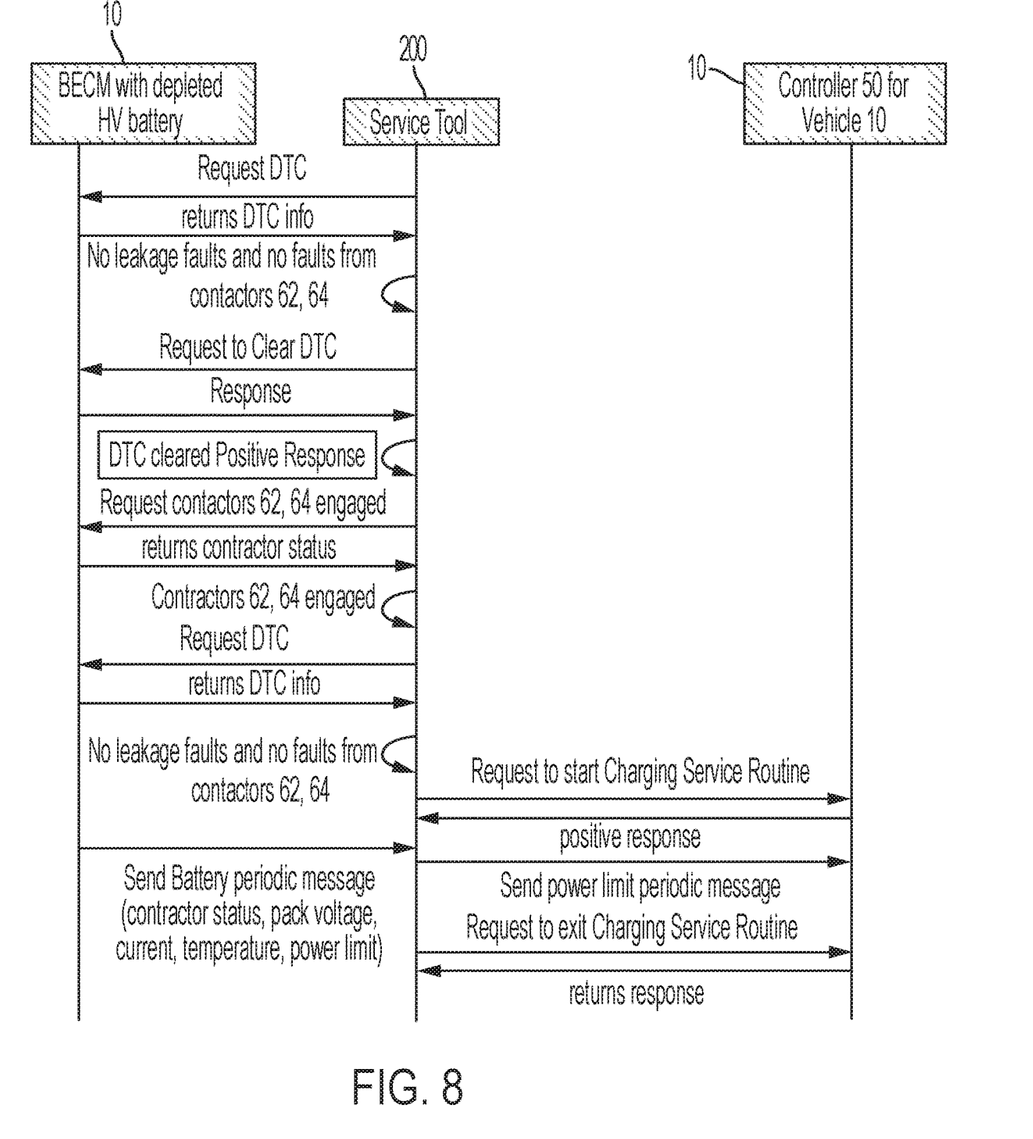
FIG. 8 illustrates a sequence during the charging service routine.

At step 308, battery 20 is connected to bus 32 and vehicle 10 may begin regenerative charging of battery 20 at step 310. FIG. 8 illustrates a portion of the control sequence that may be performed for completing step 308 and step 310.

First, service tool 200 may request certain DTC codes from vehicle 10. If vehicle 10 does not have the fault codes preventing battery charging, service tool 200 will request that all DTC codes be cleared. Once the DTC codes are cleared, service tool 200 will request that contactors 62, 64 be engaged. Vehicle 10 would first engage contactor 62, and then engage pre-charge contactor 150 until the DC-voltage across capacitor 158 reaches a DC-voltage level substantially equal to battery 20. Once capacitor 158 and battery 20 reach approximately the same voltage level, contactor 64 would be engaged and pre-charge contactor 150 would be disengaged. Service tool 200 may again request certain DTC codes from vehicle 10. If no fault codes (except battery depletion fault) are present, flow diagram 400 proceeds to step 310.

At step 310 the service tool 200 may then engage the charging service routine as also shown by FIG. 8. To perform the charging service routine, service tool 200 may request that a motor inverter control sequence be activated that enables switching of insulated gate bi-polar transistors (IGBT) 160-170. Vehicle service tool 200 may also request that engine 14 be operated and motor 18 be operated as a generator to begin regenerative charging. During the charging service routine, service tool 200 may receive information regarding battery 20, such as voltage, current, SOC, temperature and power limits. Service tool 200 may also receive information regarding the status of contactor 62, 64 to ensure proper operation. Service tool 200 may provide power limit values to vehicle 10 to ensure battery 20 is properly charged (i.e., battery charge power limit and discharge power limit is held within battery 20 power limit). If vehicle 10 provides data indicating that the battery 20 is above a predefined value (e.g., SOC>70%), the service tool 200 will transmit a signal to the vehicle 10 to exit the charging service routine.

Again, service tool 200 may continuously monitor DTC fault codes from vehicle 10 and DTC fault codes from vehicle 100. Vehicle service tool 200 may also monitor the status of contactors 62, 64; and the current and temperature of battery 20. Vehicle service tool 200 may also transmit a signal to the VSC to exit the charging service routine if: a fault code exists; contactors 62, 64 are not properly engaged; the current of battery 20 is not within a predefined current range; or the temperature of battery 20 is not within a predefined temperature range.

Upon exiting the charging service routine, the service tool 200 will open contactors 62, 64 and perform an active discharge of inverter 30. The service tool 200 may then output a message that the battery 20 is within a predefined SOC range and fault conditions do not exist. Finally, the service tool 200 may inform a technician to remove the junction box 114 and reconnect vehicle harness.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system to charge a depleted battery within a first vehicle when connected to a second vehicle, comprising:
    a wire harness having a first high voltage (HV) connector
        that connects to a first HV bus within the first vehicle and a second HV connector that connects to a second HV bus within the second vehicle;
one or more controllers operable to:
  disengage a first set of high-voltage (HV) contactors within the first vehicle to disconnect the depleted battery from the wire harness;
  engage a second set of HV contactors within the second vehicle to connect a charged battery to the wire harness;
  start a first engine within the first vehicle using a DC power supplied from the charged battery;
  responsive to starting the first engine, operate the first engine in a secondary idle condition and disengage the second set of HV contactors;
  responsive to disengaging the second set of HV contactors, engage the first set of HV contactors;
  responsive to engaging the first set of HV contactors, charge the depleted battery by operating the first engine in a primary idle condition and a first inverter within the first vehicle; and
  responsive to the depleted battery being charged, stopping operation of the first inverter.

2. The system of claim 1, wherein the one or more controllers are further operable to: monitor one or more fault codes; and disconnect the first HV connector and the second HV connector when one or more fault codes are present.

3. The system of claim 2, wherein the wire harness further includes a first high voltage interlock connector (HVIL) that connects to a first HVIL source within the first vehicle, a second HVIL connector that connects to a second HVIL source within the second vehicle.

4. The system of claim 3, wherein the one or more fault codes indicate a HVIL open circuit.

5. The system of claim 1, wherein the one or more controllers are further operable to: engage a pre-charge contactor prior to engagement of the first set of HV contactors to charge a capacitor attached to the first HV bus.

6. The system of claim 1, wherein the one or more controllers are further operable to: receive from the first vehicle a first set of power operating parameters for the depleted battery; receive from the second vehicle a second set of power operating parameters for the charged battery within the second vehicle; and verify that the first set of power operating parameters and the second set of power operating parameters permit the second vehicle to charge the depleted battery.

7. A method for charging a depleted battery within a first vehicle when connected to a second vehicle, comprising:
  connecting a wire harness having a first high voltage (HV) connector that connects to a first HV bus within the first vehicle and a second HV connector that connects to a second HV bus within the second vehicle;
  receiving from the first vehicle a first set of power operating parameters for the depleted battery;
  receiving from the second vehicle a second set of power operating parameters for a charged battery within the second vehicle;
  verifying that the first set of power operating parameters and the second set of power operating parameters permit the second vehicle to charge the depleted battery;
  disengaging a first set of high-voltage (HV) contactors within the first vehicle to disconnect the depleted battery from the wire harness;
  engaging a second set of HV contactors within the second vehicle to connect the charged battery to the wire harness;
  starting a first engine within the first vehicle using a first DC power supplied from the charged battery;
  operating the first engine in a secondary idle condition;
  disengaging the second set of HV contactors;
  engaging the first set of HV contactors;
  operating the first engine in a primary idle condition to allow the depleted battery to be charged; and
  disengaging a first inverter within the first vehicle when the first set of power operating parameters indicate that the depleted battery has been charged.

8. The method of claim 7, further comprising: monitoring one or more fault codes; and disconnecting the first HV connector and the second HV connector when one or more fault codes are present.

9. The method of claim 8, wherein the wire harness further includes a first high voltage interlock connector (HVIL) that connects to a first HVIL source within the first vehicle, a second HVIL connector that connects to a second HVIL source within the second vehicle.

10. The method of claim 9, wherein the one or more fault codes indicate a HVIL open circuit.

11. The method of claim 7, further comprising: engaging a pre-charge contactor prior to engagement of the second set of HV contactors to charge a capacitor attached to a high-voltage bus.

12. The method of claim 7, further comprising: disengaging a DC-DC converter within the first vehicle.

13. A system to charge a depleted battery within a first vehicle when connected to a second vehicle, comprising:
  a first engine within the first vehicle;
  a second engine within the second vehicle;
  a wire harness having a first high voltage (HV) connector that connects to a first HV bus within the first vehicle and a second HV connector that connects to a second HV bus within the second vehicle;
  one or more controllers operable to:
    disengage a first set of high-voltage (HV) contactors within the first vehicle to disconnect the depleted battery from the wire harness;
    engage a second set of HV contactors within the second vehicle;
    start the second engine within the second vehicle using a DC power supplied from a charged battery;
    responsive to starting the second engine, operate the second engine in a secondary idle condition and disengage the second set of HV contactors;
    responsive to disengaging the second set of HV contactors, engage the first set of HV contactors;
    responsive to engaging the first set of HV contactors, charge the depleted battery by operating the second engine in a primary idle condition and a first inverter within the second vehicle; and
    responsive to the depleted battery being charged, stopping operation of the first inverter.

14. The system of claim 13, wherein the one or more controllers are further operable to: monitor one or more fault codes; and disconnect the first HV connector and the second HV connector when one or more fault codes are present.

15. The system of claim 14, wherein the one or more fault codes indicate that the second set of HV contactors are engaged when the depleted battery is being charged.

16. The system of claim 14, wherein the one or more fault codes indicate a contactor welding fault exists for the first set of HV contactors and the second set of HV contactors.

17. The system of claim 14, wherein the one or more fault codes indicate a high voltage leakage fault exists for the first vehicle and the second vehicle.

18. The system of claim 14, wherein the wire harness further includes a first high voltage interlock connector (HVIL) that connects to a first HVIL source within the first vehicle, a second HVIL connector that connects to a second HVIL source within the second vehicle.

19. The system of claim 18, wherein the one or more fault codes indicate a HVIL open circuit.

20. The system of claim 13, wherein the one or more controllers are further operable to: receive from the first vehicle a first set of power operating parameters for the depleted battery; receive from the second vehicle a second set of power operating parameters for the charged battery within the second vehicle; and verify that the first set of power operating parameters and the second set of power operating parameters permit the second vehicle to charge the depleted battery.

* * * * *